United States Patent [19]

Asahara et al.

[11] Patent Number: 5,129,860
[45] Date of Patent: Jul. 14, 1992

[54] HOMOKINETIC UNIVERSAL JOINT

[75] Inventors: Yukio Asahara, Shizuoka; Haruo Nagatani; Takeshi Ikeda, both of Iwata, all of Japan

[73] Assignee: NTN Corporation, Osaka, Japan

[21] Appl. No.: 694,177

[22] Filed: May 1, 1991

[51] Int. Cl.$^5$ .............................................. F16D 3/205
[52] U.S. Cl. ..................................... 464/111; 464/905
[58] Field of Search ............... 464/111, 112, 120–124, 464/128–130, 132, 136, 902, 905

[56] References Cited

U.S. PATENT DOCUMENTS

| 4,634,402 | 1/1987 | Hazebrook | 464/141 |
| 4,693,698 | 9/1987 | Olson, II | 464/111 |
| 4,786,270 | 11/1988 | Iwasaki | 464/111 |

Primary Examiner—Daniel P. Stodola
Assistant Examiner—William G. Battista, Jr.
Attorney, Agent, or Firm—Nikaido, Marmelstein, Murray and Oram

[57] ABSTRACT

A homokinetic universal joint having an outer ring formed in its inner periphery with three axially extending cylindrical track grooves and a tripod member mounted in the outer ring and having three trunnions extending radially so as to be inserted in the track grooves. A guide roller is mounted on each trunnion through needle rollers so as to be engaged in each track groove. Each needle roller or each guide roller is formed with minute recesses arranged at random so that the RMS(L)/RMS(C) ratio will be not more than 1.0 wherein RMS(L) and RMS(C) are surface roughness values in the longitudinal and circumferential directions, respectively. An SK value, another surface roughness parameter, is set to be not more than −1.5. Each minute recess should have an area ratio of the minute recesses to the entire surface being 10–40% and an average area of 35–150 square microns.

4 Claims, 5 Drawing Sheets

HOMOKINETIC UNIVERSAL JOINT

This invention relates to a homokinetic universal joint for use in an automobile, and more specifically to a tripod type homokinetic universal joint having an outer ring formed with track grooves and a tripod member coupled to the outer ring through needle rollers and guide rollers engaged in the track grooves.

As a tripod type homokinetic universal joint applicable to a front wheel drive car, there is one shown in FIGS. 1 and 2 which comprises an outer ring 1 formed in its inner peripheral surface with three axial cylindrical track grooves 2, is a tripod member 3 mounted in the outer ring 1 and provided with three radial trunnions 4 inserted in the respective track grooves 2, and guide rollers 5 each rotatably mounted on the trunnions 4 through needle rollers 8. Each guide roller 5 has its spherical outer periphery 5a held in engagement with cylindrical roller guide surfaces 2a at both sides of the track groove 2 to allow torque transmission between the outer ring 1 and the tripod member 3.

As another tripod type homokinetic universal joint having the same basic structure as above, there is one shown in FIGS. 3 and 4 having guide rollers 5 each comprising an outer roller 6 having a spherical outer periphery and an inner roller 7 fitted in the outer ring 6. The outer rollers 6 have their outer spherical periphery in engagement with the track groove 2.

The needle rollers 8 and the guide rollers 5 in the above-described homokinetic universal joints have a surface finished by polishing.

In case of the homokinetic universal joint shown in FIGS. 1 and 2, when the guide rollers 5 are subjected to load while rolling on the track grooves 2 formed in the outer ring 1, the load has to be supported by the needle rollers 8. But if lubrication is insufficient between the needle rollers 8 and the trunnions 4 and/or between the needle rollers 8 and the guide rollers 5, the guide rollers 5 cannot roll smoothly. This may cause the guide rollers 5 to slip on the guide surfaces 2a of the track grooves 2.

Similarly, in the example shown in FIGS. 3 and 4, if lubrication becomes insufficient due to disappearance of oil film between the inner rollers 7 and the outer rollers 6, between the inner rollers 7 and the needle rollers 8 or between the outer rollers 6 and the track grooves 2 in the outer ring 1, the resulting sliding motion will have a bad influence on the thrust induced in the homokinetic universal joint. Further, this will cause heat buildup.

If slip occurs between the guide rollers and the guide surfaces on the track grooves, wear on the latter and heat buildup will result.

Further, it is well-known that the rolling life of the needle rollers in a needle roller bearing is influenced greatly by the surface roughness of the rolling surface. Heretofore, it was thought that the rolling surface should be finished as smoothly as possible. But after trail and error, the present inventors have found that the life can be extended even if the rolling surfaces are not finished smoothly.

It is an object of this invention to provide a homokinetic universal joint which permits a sufficient oil film formation on the needle rollers and guide rollers for smooth rotation thereof, thus avoiding wear and peeling.

In accordance with the present invention, there is provided a homokinetic universal joint comprising an outer ring formed in its inner periphery with three axially extending cylindrical track grooves, a tripod member mounted in the outer ring and having three trunnions extending radially so as to be inserted in the respective track grooves, needle rollers arranged around the trunnions, and guide rollers each mounted on the respective trunnions through the needle rollers and engaged in the respective track grooves, at least one of the each needle roller and the each guide roller being formed in the surface thereof with a multiplicity of minute recesses arranged at random so that an RMS(L)/RMS(C) ratio is not more than 1.0 wherein RMS(L) and RMS(C) are surface roughness values in the longitudinal and circumferential directions, respectively, and so that the SK value, which is another surface roughness parameter, is not more than $-1.5$.

This improves the oil film formation ratio on the needle rollers and the guide rollers and the rotatability and the wear resistance thereof. Reduction of slip results in less heat buildup. Also, peeling can be reduced to a minimum.

Other features and objects of the present invention will become apparent from the following description taken with reference to the accompanying drawings, in which.

Now the embodiments of this invention will be described with reference to the accompany drawings.

The basic structure of a tripod type homokinetic universal joint is as shown in FIGS. 1 and 2 and FIGS. 3 and 4.

According to the present invention, the needle rollers 8 and/or guide rollers 5 have a rough surface formed with minute recesses arranged at random.

Figure 1:
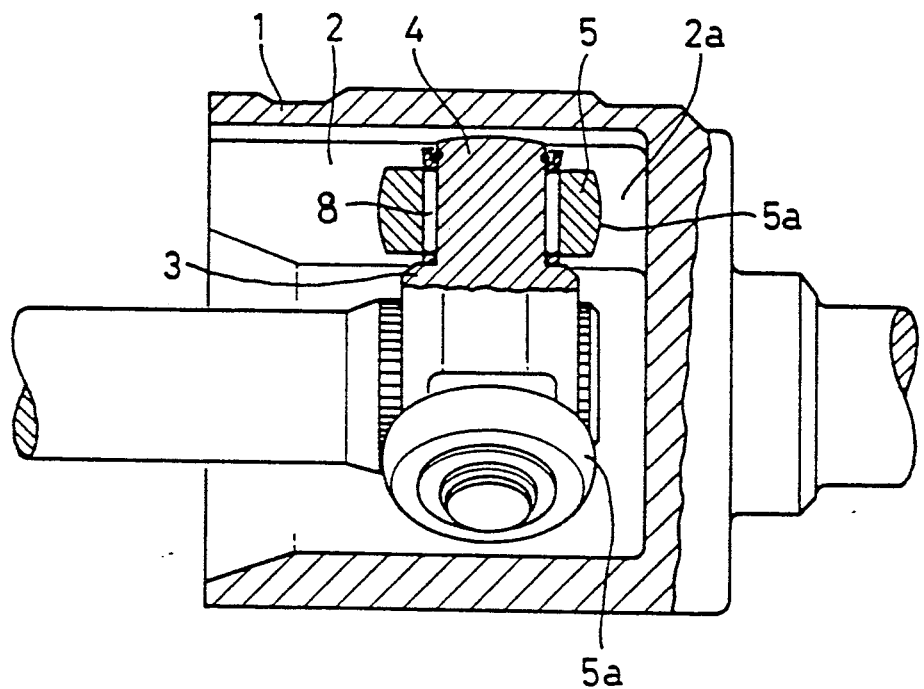
FIG. 1 is a vertical sectional front view of a first embodiment of a homokinetic universal joint.
Figure 2:
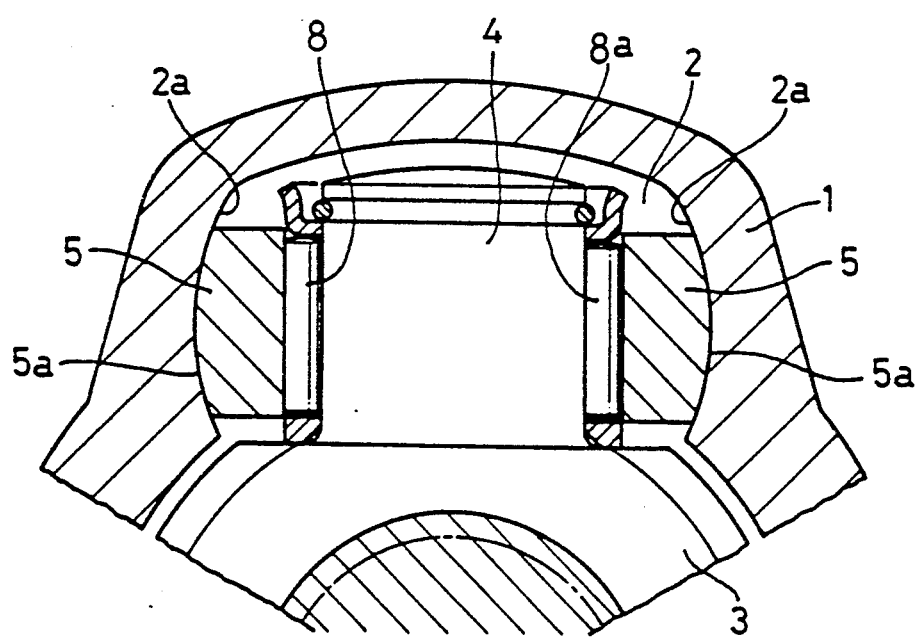
FIG. 2 is an enlarged vertical sectional side view of a portion of the same.
Figure 3:
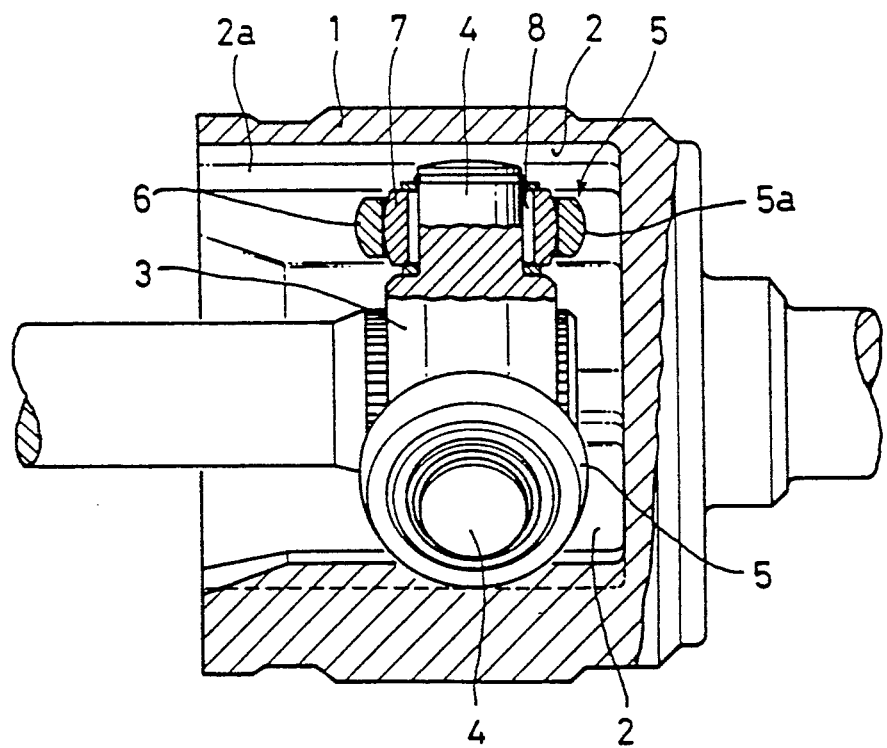
FIG. 3 is a vertical sectional front view of a second embodiment.
Figure 4:
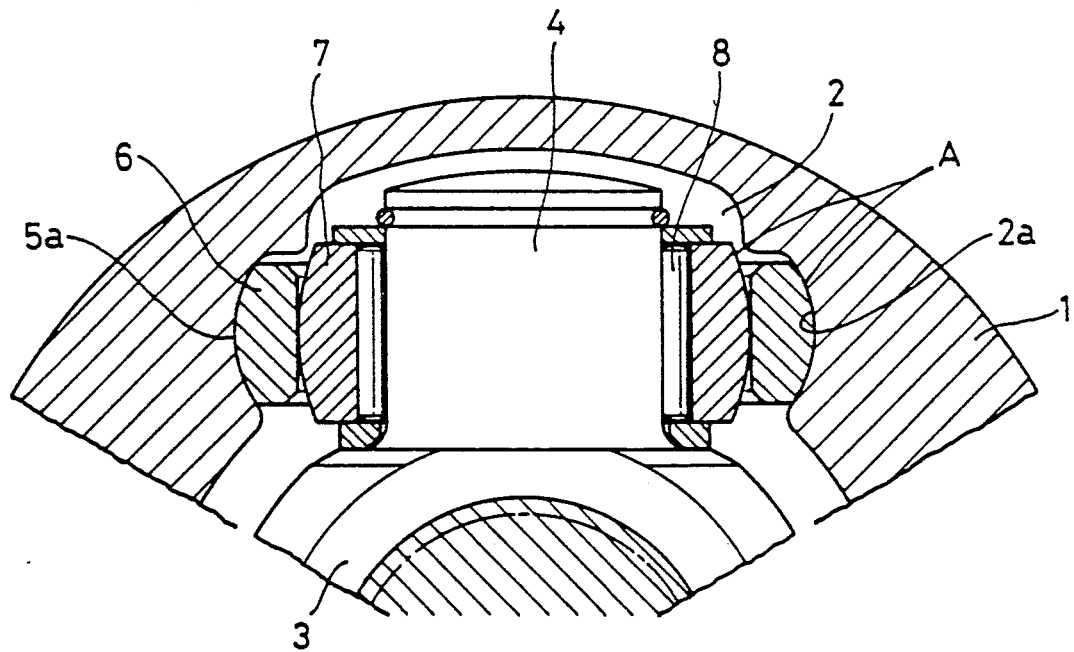
FIG. 4 is an enlarged vertical sectional view of a portion of the same.

In the example shown in FIGS. 3 and 4, the surface of needle rollers 8 or the surface of one or both of each inner roller 7 and each outer roller 6 has a rough surface A having minute recesses arranged at random.

The rough surface should have such a roughness that the ratio RMS(L)/RMS(C) will be not more than 1.0, preferably 0.7 to 1.0 wherein RMS(L) is the roughness mean square value in the longitudinal direction whereas RMS(C) is the same value in the circumferential direction and that the SK value, which is another parameter representing the surface roughness, is not more than $-1.5$ in both the longitudinal and circumferential directions.

The SK value represents the skewness of a distribution curve of the surface roughness. With a symmetrical distribution such as Gauss distribution, the SK value is zero. According to this invention, in order to allow a sufficient oil formation, the SK value should be not more than $-1.5$ both in the circumferential and longitudinal directions. If it is within this range, the shape and distribution of the recesses are advantageous in forming an oil film.

Such a rough surface may be formed by barreling, so that a desired finished surface is obtained.

Figure 5:
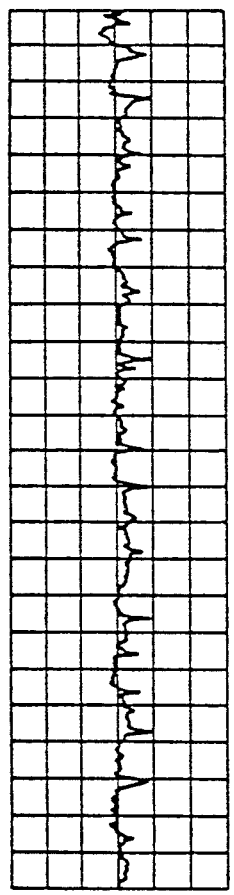
FIG. 5 is an enlarged view showing the roughness of the rough surface.

FIG. 5 shows in section the roughness of the rough surface A. As shown in this figure, the rough surface is made up of only recesses with no projections protruding beyond its plane.

The raceway for the needle rollers 8, i.e. the inner peripheral surfaces of the guide rollers 5 and the outer peripheral surfaces of the trunnions 4 are finished by grinding. The guide grooves 2 formed in the outer ring 1 is finished by cold forging.

Each minute recess in the rough surface A should have an average of 35–150 square microns calculated excepting recesses having a smaller diameter than 3 microns. The ratio of the total area of the recesses to the entire surface should be 10–40%.

A quantitative measurement of the minute recesses can be made by enlarging the rough surface and analyzing the enlarged image by means of a commercially available image analyzing system.

In analyzing an image, white and black portions are identified as flat parts and minute recesses, respectively. If an image analyzing system is used, the light and shade of the original image are exaggerated by use of an exaggerating filter and very minute black dots with a diameter of 3 microns or less are erased by use of a noise eraser. The minute recesses remaining even after erasing are then checked for size and distribution and the ratio of the area of the minute recess to the entire surface is determined to evaluate the rolling surface of the rolling elements.

The durability tests were conducted on a conventional needle roller bearing in which the inner ring (or the mating shaft) and the needle rollers have their surfaces super-finished and a needle roller bearing according to this invention in which the inner ring (or the mating shaft) has its surface finished by grinding while the needle rollers have their surfaces roughened by forming minute recesses arranged at random.

The super-finished surfaces of the inner ring and the needle rollers had a roughness Rmax of not more than 0.4 microns, whereas the rough surface having minute recesses in random directions is 2 microns Rmax in roughness and the ground surface of the inner ring is 2–4 microns Rmax in roughness.

Figure 6:
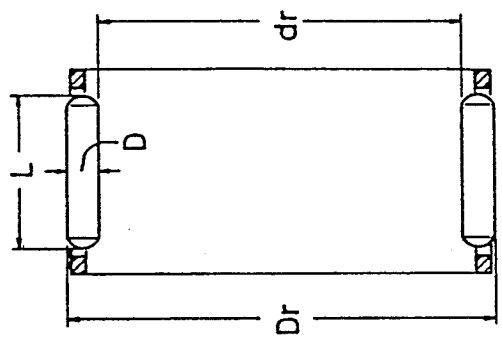
FIG. 6 is a sectional view of a needle roller bearing used for the life test.

As shown in FIG. 6, the needle roller bearings used in the life test had an external diameter Dr of 38 mm and an internal diameter dr of 28 mm and included 14 rolling elements supported by a cage and each having a diameter D of 5 mm and a length L of 13 mm.

Figure 7:
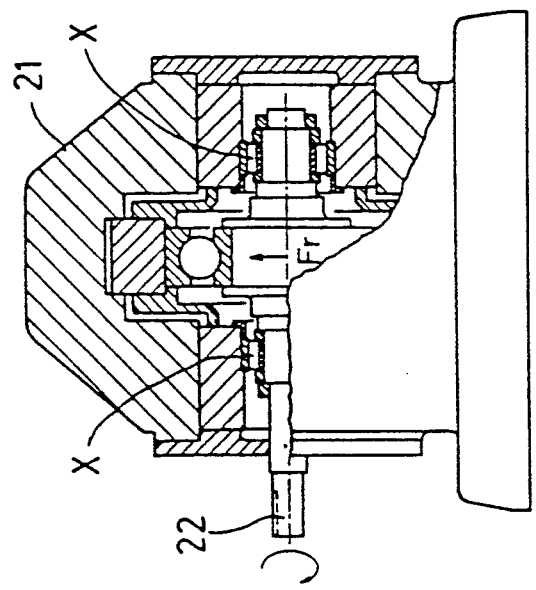
FIG. 7 is a schematic view of the testing device used.

The testing device used was a radial load tester 21 as shown schematically in FIG. 7. Test bearings X were mounted on both sides of its rotary shaft 22 and rotated under load.

Figure 8:
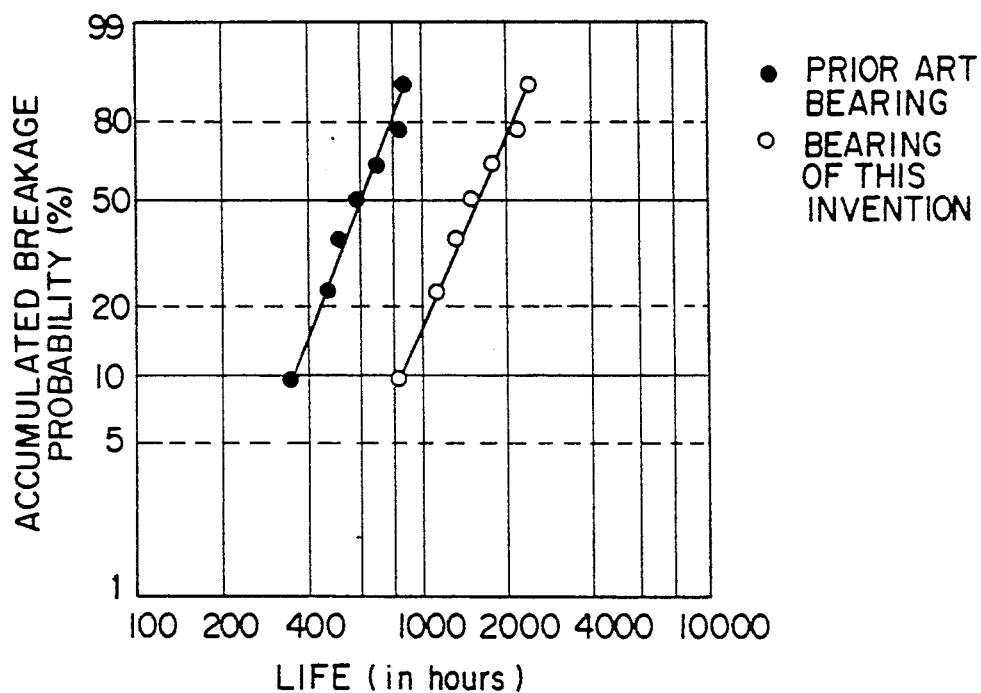
FIG. 8 is a graph showing the results of the life test.

Test conditions were as follows:
Roller surface pressure: 2.8 GPa
Number of revolutions: 3050 rpm
Lubricant: Turbine oil FIG. 8 shows the results of the life test conducted for the needle rollers of each test bearing under the above conditions.

As is apparent from the test results, the probability of breakage reached 10% after 380 hours with the prior art needle roller bearing while the 10% probability of breakage was reached only after 840 hours with the needle roller bearing having minute rough surfaces. Thus the latter has a considerably longer life.

Figure 9:
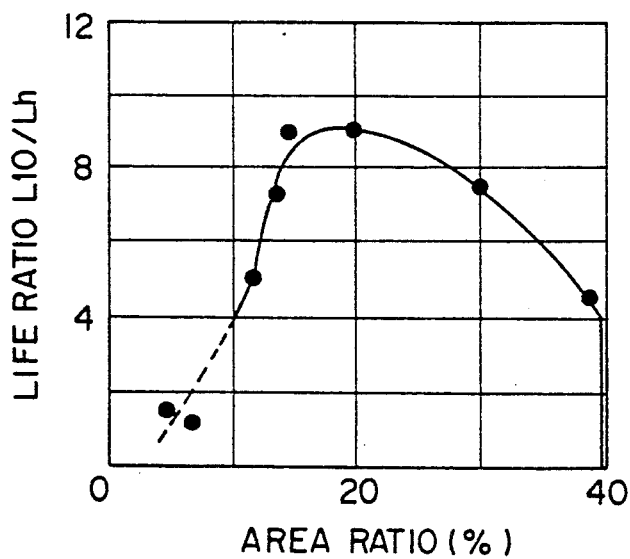
FIGS. 9 and 10 are graphs showing the results of the duration tests.
Figure 10:
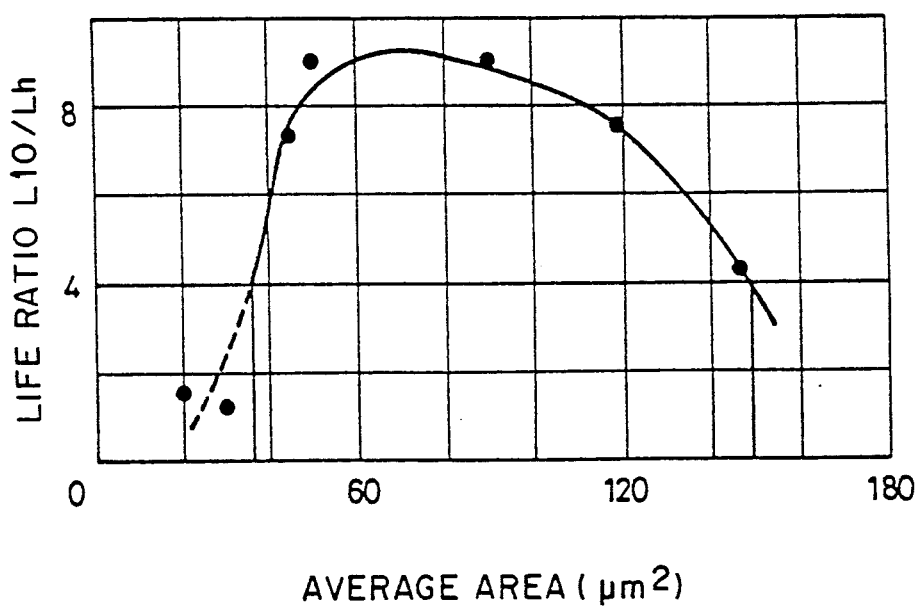

FIG. 9 shows the relation between the area ratio of the minute recesses and the life and FIG. 10 shows the relation between the average area of the minute recesses and the life.

The results show that if the area ratio is 10% or more and the average area is 35 square microns or more, the rolling life increases.

If the area ratio is 40% or more and the average area is 150 square micron more, no significant effect on the life can be expected because of reduced effective contact area.

The special surface should preferably be kept in a state which satisfies the resistance to sliding friction. anti-seizure properties and rolling fatigue life.

Although the abovesaid tests were conducted on the rolling elements of a needle roller bearing formed with minute recesses, similar effects on the durability were confirmed on guide rollers whose inner or outer rings and rolling elements were formed with minute recesses.

Next, a homokinetic universal joint having needle rollers treated according to this invention and a prior art homokinetic universal joint were put to a cycle durability test to measure the average depth of wear and the number of peelings on the guide surfaces 2a of the track grooves 2 formed in the outer ring 1. The results are shown in Table 1.

TABLE 1

|  | Needle roller | |
|---|---|---|
|  | Treated according to present invention | prior art |
| Average wear on guide surface of track groove in outer ring | 19.2 microns | 42.5 microns |
| Number of peelings | 1 | 6 |

As is apparent from the test results, with the homokinetic universal joint according to this invention, the depth of wear and the number of peelings reduced to half and one-sixth, respectively, compared with the prior art joint.

Next, a homokinetic universal joint having spherical rollers having their surfaces treated according to this invention and a prior art homokinetic joint were put to a cycle durability test to measure the average depth of wear and the number of peelings on the guide surfaces 2a of the track grooves 2 in the outer ring 1. The results are shown in Table 2.

As is apparent from the test results, with the homokinetic universal joint according to this invention, the depth of wear and the number of peelings reduced to half and one-fifth, respectively, compared with the prior art joint.

TABLE 2

|  | Guide roller | |
|---|---|---|
|  | Treated according to present invention | prior art |
| Average wear on guide surface of track groove in outer ring | 18 microns | 38 microns |
| Number of peelings | 1 | 5 |

What is claimed is:

1. A homokinetic universal joint comprising an outer ring formed in its inner periphery with three axially extending cylindrical track grooves, a tripod member mounted in said outer ring and having three trunnions extending radially so as to be inserted in said respective track grooves, needle rollers arranged around said trunnions, and guide rollers each mounted on said respective trunnions through said needle rollers and engaged in said respective track grooves, at least one of said each needle roller and said each guide roller being formed in the surface thereof with a multiplicity of minute recesses arranged at random so that an RMS(L)/RMS(C) ratio is not more than 1.0 wherein RMS(L) and RMS(C) are surface roughness values in the longitudinal and circumferential directions, respectively, and so that the SK value, which is another surface roughness parameter, is not more than −1.5.

2. A homokinetic universal joint as claimed in claim 1 wherein the area ratio of said minute recesses to the entire surface is 10 to 40%.

3. A homokinetic universal joint as claimed in claim 1, wherein said minute recesses each have an average area of 35–150 square microns.

4. A homokinetic universal joint as claimed in claim 1, wherein said guide roller comprises an outer roller and an inner roller.

* * * * *